US012662850B2

(12) United States Patent
Chen et al.

(10) Patent No.: US 12,662,850 B2
(45) Date of Patent: Jun. 23, 2026

(54) SLIDE RAIL KIT

(71) Applicants: King Slide Works Co., Ltd., Kaohsiung City (TW); King Slide Technology Co., Ltd., Kaohsiung City (TW)

(72) Inventors: Ken-Ching Chen, Kaohsiung City (TW); Shun-Ho Yang, Kaohsiung City (TW); Chien-Li Huang, Kaohsiung City (TW); Chun-Chiang Wang, Kaohsiung City (TW)

(73) Assignees: King Slide Works Co., Ltd., Kaohsiung City (TW); King Slide Technology Co., Ltd., Kaohsiung City (TW)

( * ) Notice: Subject to any disclaimer, the term of this patent is extended or adjusted under 35 U.S.C. 154(b) by 90 days.

(21) Appl. No.: 18/603,939

(22) Filed: Mar. 13, 2024

(65) Prior Publication Data

US 2025/0129637 A1 Apr. 24, 2025

(30) Foreign Application Priority Data

Oct. 24, 2023 (TW) ................................ 112140960

(51) Int. Cl.
*E05B 65/46* (2017.01)
*A47B 88/423* (2017.01)

(52) U.S. Cl.
CPC ............ *E05B 65/46* (2013.01); *A47B 88/423* (2017.01)

(58) Field of Classification Search
CPC ....... E05B 65/46; A47B 88/423; A47B 88/43; H05K 7/1489
See application file for complete search history.

(56) References Cited

U.S. PATENT DOCUMENTS

| | | | | |
|---|---|---|---|---|
| 9,545,153 | B2 * | 1/2017 | Chen | A47B 88/43 |
| 9,681,573 | B2 * | 6/2017 | Chen | A47B 88/40 |
| 9,743,767 | B1 * | 8/2017 | Easton | A47B 88/43 |
| 9,861,196 | B2 * | 1/2018 | Chen | A47B 88/50 |
| 10,292,493 | B2 * | 5/2019 | Chen | H05K 7/1489 |
| 10,292,496 | B2 * | 5/2019 | Chen | F16B 2/10 |
| 10,485,132 | B2 * | 11/2019 | Bold | H05K 7/1489 |
| 10,736,420 | B2 * | 8/2020 | Chen | A47B 57/38 |
| 10,736,422 | B2 * | 8/2020 | Chen | A47B 88/49 |
| 10,765,207 | B2 * | 9/2020 | Chen | H05K 7/1489 |
| 10,925,398 | B2 * | 2/2021 | Chen | A47B 88/43 |

(Continued)

FOREIGN PATENT DOCUMENTS

| | | | | |
|---|---|---|---|---|
| EP | 3005901 | B1 * | 5/2019 | A47B 88/43 |
| EP | 3886546 | A1 | 9/2021 | |

(Continued)

*Primary Examiner* — Hanh V Tran

(74) *Attorney, Agent, or Firm* — Best & Flanagan LLP

(57) ABSTRACT

A slide rail kit is applicable to a rack. The slide rail kit includes a first rail and a locking member. The first rail is arranged with a mounting feature. The locking member is arranged on the first rail. The mounting feature is configured to mount the first rail to a mounting structure of the rack. The locking member includes a locking part and an operating part. The locking part is configured to be held in a state being blocked by the rack in response to an elastic force of an elastic structure. The operating part is configured to be operated to move the locking part away from the state being blocked by the rack.

12 Claims, 15 Drawing Sheets

(56) References Cited

U.S. PATENT DOCUMENTS

| | | | | |
|---|---|---|---|---|
| 11,266,237 | B2 * | 3/2022 | Chen | H05K 7/1489 |
| 11,647,836 | B2 * | 5/2023 | Chen | A47B 57/32<br>211/162 |
| 2020/0107636 | A1 | 4/2020 | Chen et al. | |
| 2022/0087421 | A1 * | 3/2022 | Chen | H05K 7/183 |

FOREIGN PATENT DOCUMENTS

| | | | |
|---|---|---|---|
| JP | 2018-061827 | A | 4/2018 |
| JP | 2021154104 | A | 10/2021 |

* cited by examiner

SLIDE RAIL KIT

BACKGROUND OF THE INVENTION

1. Field of the Invention

The present invention relates to a slide rail, and more particularly, to a slide rail kit applicable to a rack.

2. Description of the Prior Art

Generally, in a rack system, a carried object (such as electronic equipment) can be mounted to a rack through at least one slide rail. The rack has a plurality of posts. Depending on the specifications or types of the rack, the posts have a plurality of different mounting features for mounting a plurality of mounting parts of the at least one slide rail. The mounting features and the mounting parts usually require tools (such as screws) to mount the at least one slide rail to the rack.

Currently, there are products capable of mounting the slide rail to the rack without tools. For example, U.S. Pat. No. 11,647,836 B2 discloses a slide rail kit that can be mounted to a rack without tools. The rack comprises at least one mounting structure, and the at least one mounting structure has a first predetermined portion and a second predetermined portion. The first predetermined portion and the second predetermined portion are located at different heights of the rack. The slide rail kit comprises a rail member and a bracket. The bracket is arranged on the rail member and comprises a first mounting feature and a second mounting feature. The first mounting feature is configured to be mounted to the first predetermined portion of the rack. The bracket is higher than the rail member, such that the second mounting feature is located at a position higher than the rail member and substantially corresponds to the second predetermined portion. The second mounting feature comprises an elastic member and a mounting member. The mounting member is configured to be mounted to the second predetermined portion of the rack from an outer side of the bracket in response to an elastic force of the elastic member.

However, for different market requirements, it is important to develop various slide rail products.

SUMMARY OF THE INVENTION

The present invention provides a slide rail kit applicable to a rack.

According to an embodiment of the present invention, a slide rail kit comprises a first rail and a locking member. The first rail comprises a side wall. The first rail has a mounting feature, and the side wall has an inner side and an outer side facing toward the rack. The locking member is arranged on the first rail and comprises a locking part and an operating part. The mounting feature is configured to mount the first rail to a mounting structure of the rack. The locking part is configured to be held at the outer side of the side wall of the first rail to be blocked by the rack in response to an elastic force of an elastic structure. The operating part is configured to be operated to move the locking part toward the inner side of the side wall of the first rail, such that the locking part is no longer blocked by the rack.

According to another embodiment of the present invention, a slide rail kit comprises a first rail, a second rail and a locking member. The first rail comprises a first wall, a second wall and a side wall connected between the first wall and the second wall. A passage is defined by the first wall, the second wall and the side wall. The side wall has an inner side and an outer side facing toward the rack. A mounting feature is arranged at the outer side. The second rail is movably mounted in the passage of the first rail. The locking member is arranged on the first rail and comprises a locking part and an operating part. The mounting feature is configured to mount the first rail to a mounting structure of the rack. The locking member is configured to be held in a state being blocked by the rack in response to an elastic force of an elastic structure. The operating part is configured to be operated to move the locking part away from the state being blocked by the rack. The second rail is located at the inner side of the side wall of the first rail. When the second rail is located at a retracted position relative to the first rail, the second rail does not cover the operating part.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
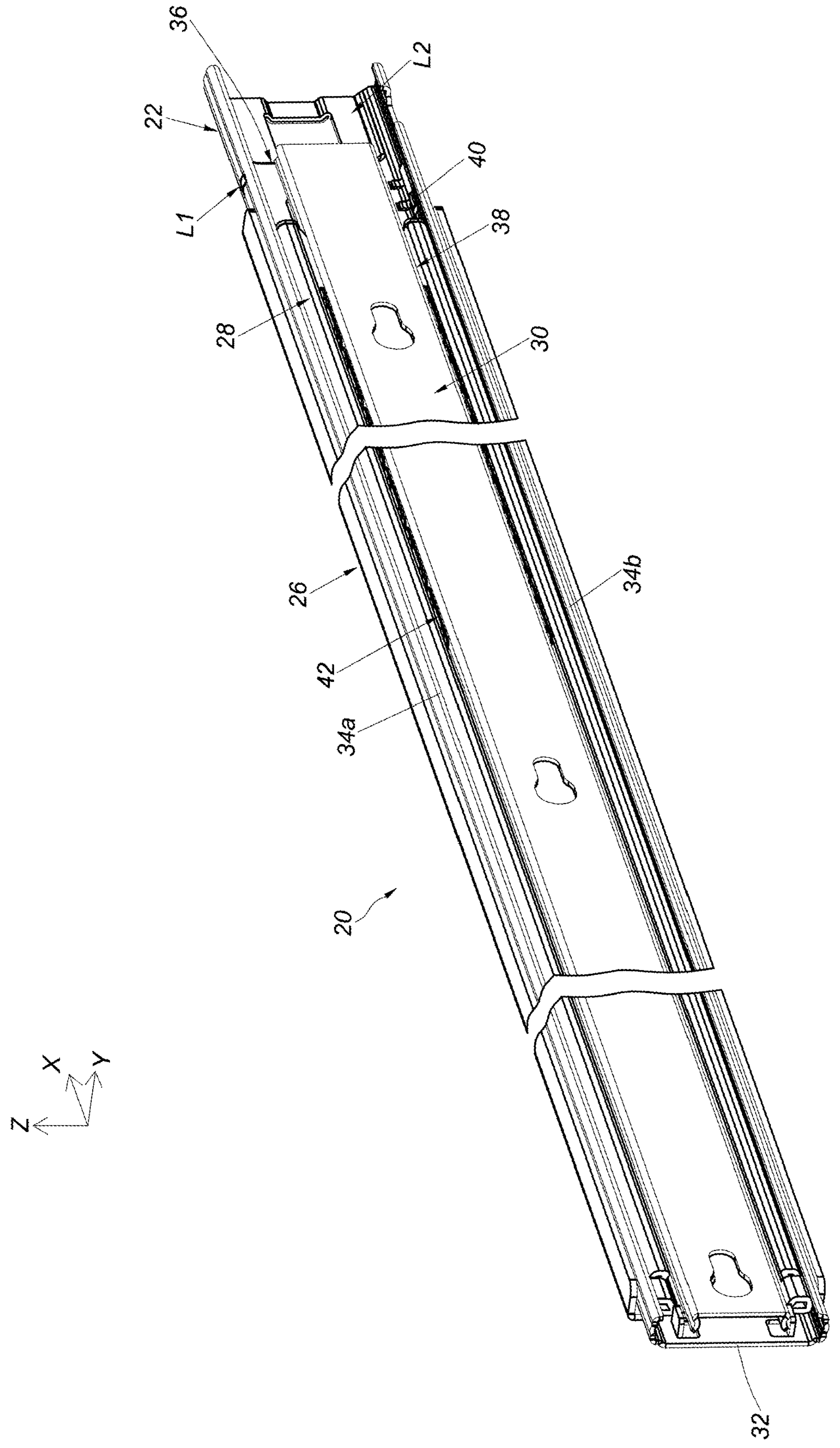
FIG. 1 is a diagram showing a slide rail kit according to a first embodiment of the present invention.
Figure 2:
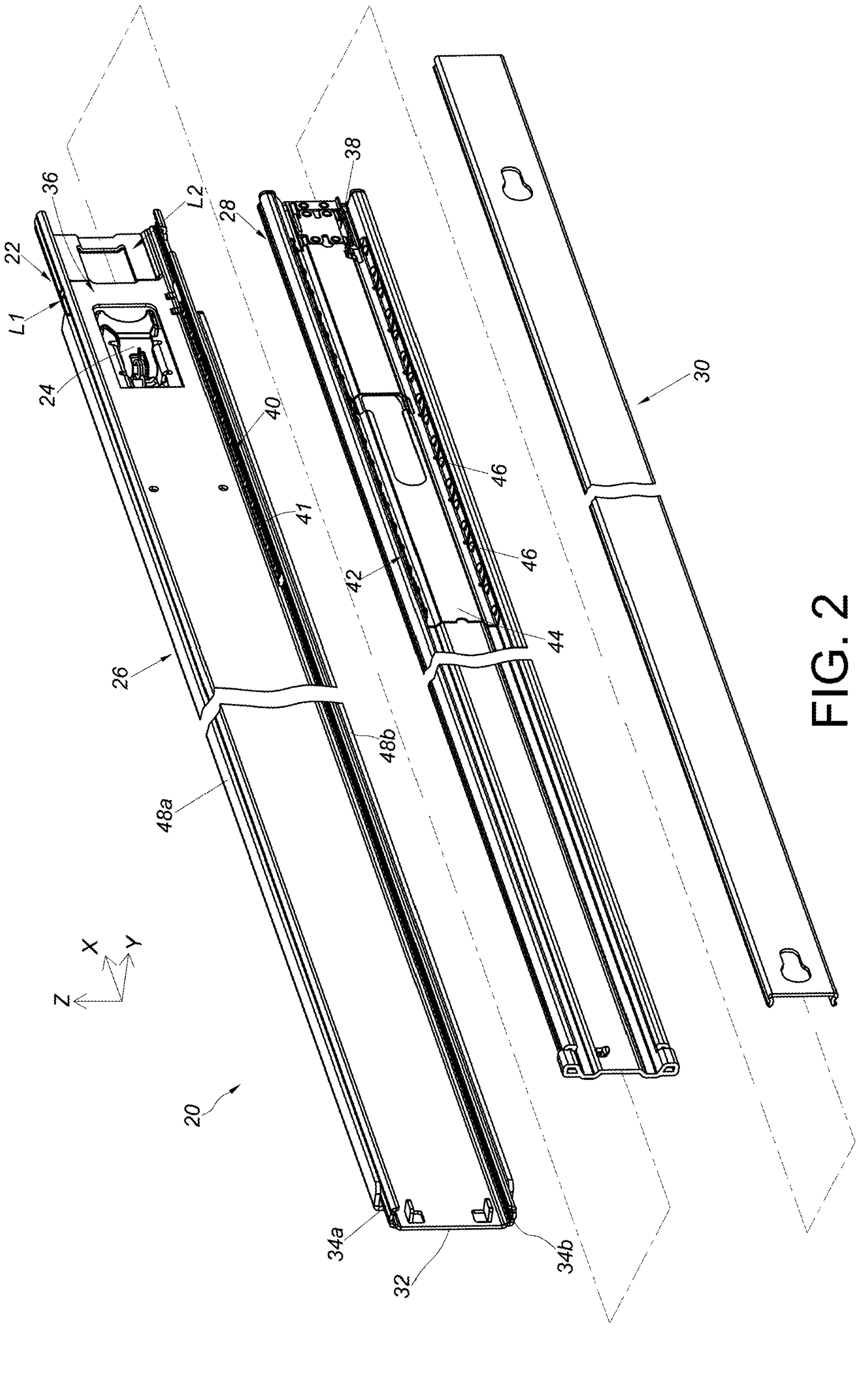
FIG. 2 is an exploded view of the slide rail kit comprising a first rail, a second rail and a third rail according to the first embodiment of the present invention.

As shown in FIG. 1 and FIG. 2, a slide rail kit 20 comprises a first rail 22 (such as an outer rail) and a locking member 24 according to a first embodiment of the present invention. Preferably, the slide rail kit 20 further comprises a bracket 26, a second rail 28 (such as a middle rail) and a third rail 30 (such as an inner rail). The first rail 22, the second rail 28 and the third rail 30 are longitudinally movable relative to each other. In the present embodiment, the X-axis is a longitudinal direction (or a length direction of the slide rail), the Y-axis is a transverse direction (or a lateral direction of the slide rail), and the Z-axis is a vertical direction (or a height direction of the slide rail).

The first rail 22 comprises a side wall 32. Preferably, the first rail 22 further comprises a first wall 34*a* and a second wall 34*b*. The side wall 32 of the first rail 22 is connected between the first wall 34*a* and the second wall 34*b* of the first rail 22. A passage 36 is defined by the first wall 34*a*, the second wall 34*b* and the side wall 32 of the first rail 22. Preferably, the side wall 32 of the first rail 22 has an outer side L1 and an inner side L2. The second rail 28 is movably mounted in the passage 36 of the first rail 22, and the second rail 28 is located at the inner side L2 of the side wall 32 of the first rail 22. In addition, the third rail 30 is movably mounted in a passage 38 of the second rail 28.

The bracket 26 is attached to the first rail 22. In the present embodiment, the bracket 26 is fixed to the first rail 22, such that the bracket 26 and the first rail 22 can be seen as one piece; or in an alternative embodiment, the bracket 26 can be integrated into the first rail 22. However, the present invention is not limited thereto.

The locking member 24 is arranged on the first rail 22. Furthermore, the locking member 24 is movably mounted to the bracket 26.

Preferably, the slide rail kit 20 further comprises at least one first slide assisting device 40 movably mounted between the first rail 22 and the second rail 28 and configured to assist relative movement between the first rail 22 and the second rail 28. Preferably, the slide rail kit 20 of the first embodiment comprises two first slide assisting devices 40 located inside the passage 36 of the first rail 22 and adjacent to the first wall 34*a* and the second wall 34*b* respectively, but the present invention is not limited thereto. Each of the first slide assisting devices 40 comprises a plurality of balls 41. Due to the viewing angle, only the first slide assisting device 40 adjacent to the second wall 34*b* is shown in FIG. 1 and FIG. 2.

Preferably, the slide rail kit 20 further comprises a second slide assisting device 42 movably mounted between the second rail 28 and the third rail 30 and configured to assist relative movement between the second rail 28 and the third rail 30. The second slide assisting device 42 comprises a ball retainer 44 and a plurality of balls 46 mounted on the ball retainer 44.

Figure 3:
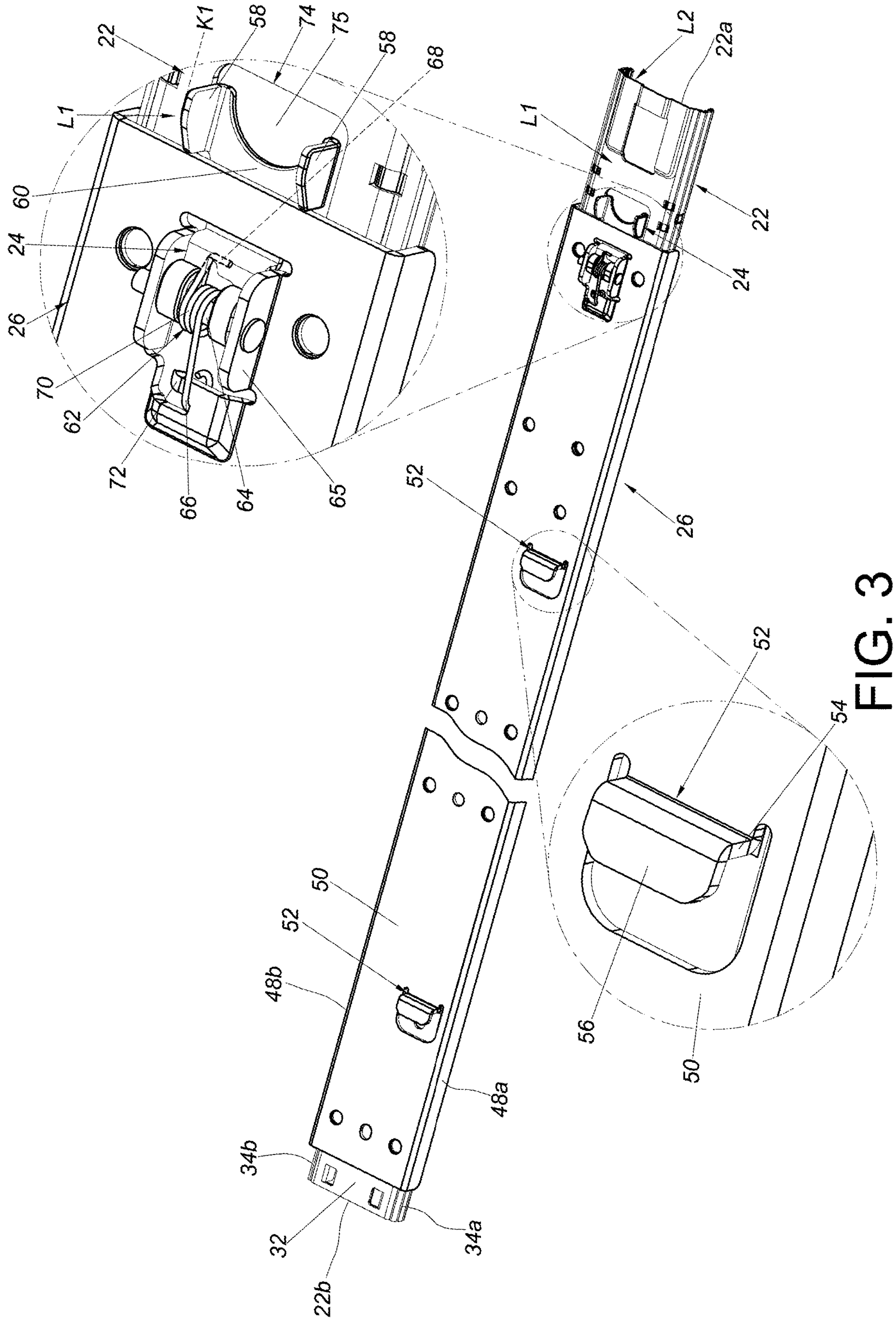
FIG. 3 is a diagram showing the first rail from a first viewing angle according to the first embodiment of the present invention.
Figure 4:
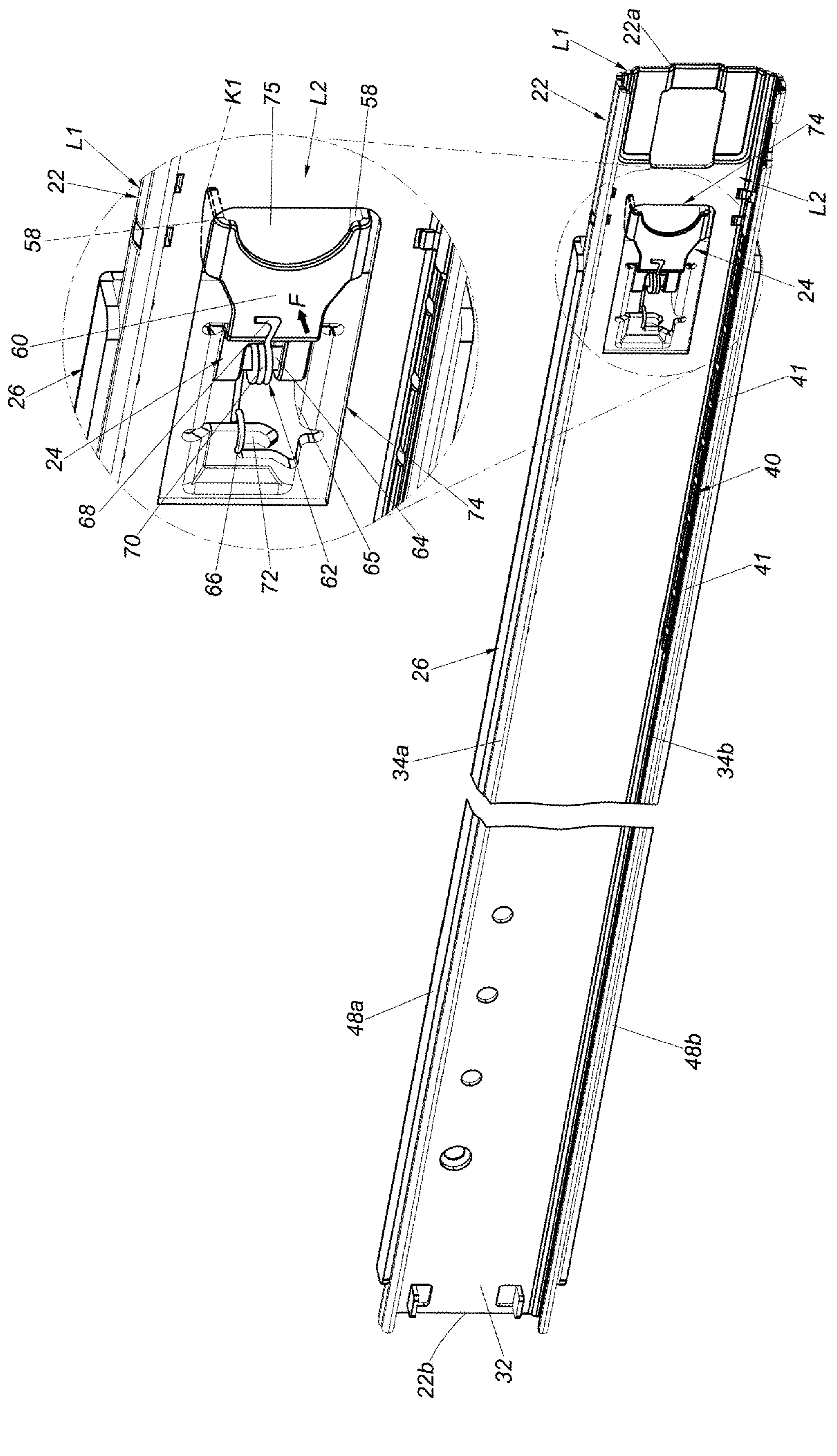
FIG. 4 is a diagram showing the first rail from a second viewing angle with a locking member being in a locking state according to the first embodiment of the present invention.

As shown in FIG. 3 and FIG. 4, the bracket 26 comprises a first edge part 48*a*, a second edge part 48*b*, and a side part 50 connected between the first edge part 48*a* and the second edge part 48*b*. The side part 50 of the bracket 26 is fixed to the outer side L1 of the side wall 32 of the first rail 22 (as shown in FIG. 3), and the first edge part 48*a* and the second edge part 48*b* of the bracket 26 are configured to respectively hold the first wall 34*a* and the second wall 34*b* of the first rail 22, so as to improve structural strength or supporting strength of the first rail 22.

Furthermore, the first rail 22 is arranged with at least one mounting feature 52. In the present embodiment, the mounting feature 52 is arranged on the side part 50 of the bracket 26 on the first rail 22 (as shown in FIG. 3). The mounting feature 52 can be an insertion structure. Preferably, the mounting feature 52 has a first predetermined section 54 and a second predetermined section 56. The first predetermined section 54 is transversely (laterally) extended from the side part 50 of the bracket 26. The second predetermined section 56 is bent relative to the first predetermined section 54. For example, the second predetermined section 56 is substantially perpendicularly connected to the first predetermined section 54, and the second predetermined section 56 is substantially parallel to a length direction of the first rail 22 (and the bracket 26) (as shown in FIG. 3), but the present invention is not limited thereto.

The locking member 24 comprises at least one locking part 58 and an operating part 60. The locking part 58 is configured to be held at the outer side L1 of the side wall 32 of the first rail 22 (as shown in FIG. 3) in response to an elastic force F of an elastic structure 62. Furthermore, the locking member 24 is configured to be held in a locking state K1 in response to the elastic force F of the elastic structure 62, such that the locking part 58 of the locking member 24 is held at the outer side L1 of the side wall 32 of the first rail 22.

Preferably, the locking member 24 is pivotally connected to the bracket 26 through a shaft member 64. In the present embodiment, the locking member 24 is pivotally connected to at least one lug 65 of the bracket 26 through the shaft member 64.

Preferably, the elastic structure 62 comprises a first elastic section 66, a second elastic section 68 and a middle part 70 connected between the first elastic section 66 and the second elastic section 68. The middle part 70 is mounted to the shaft member 64. The first elastic section 66 contacts one of the bracket 26 and the first rail 22. In the present embodiment, the first elastic section 66 is connected to a predetermined part 72 of the bracket 26. The second elastic section 68 contacts the locking member 24.

Preferably, the first rail 22 has a first end part 22*a* and a second end part 22*b* opposite to each other (such as a front end part and a rear end part). The locking member 24 is located adjacent to the first end part 22*a* of the first rail 22.

Preferably, the first rail 22 is formed with a predetermined hole 74 communicating the outer side L1 and the inner side L2 of the side wall 32. The predetermined hole 74 is arranged at a position at least corresponding to the operating part 60 of the locking member 24 so as to allow a user to easily operate the operating part 60 of the locking member 24 by a finger.

Figure 5:
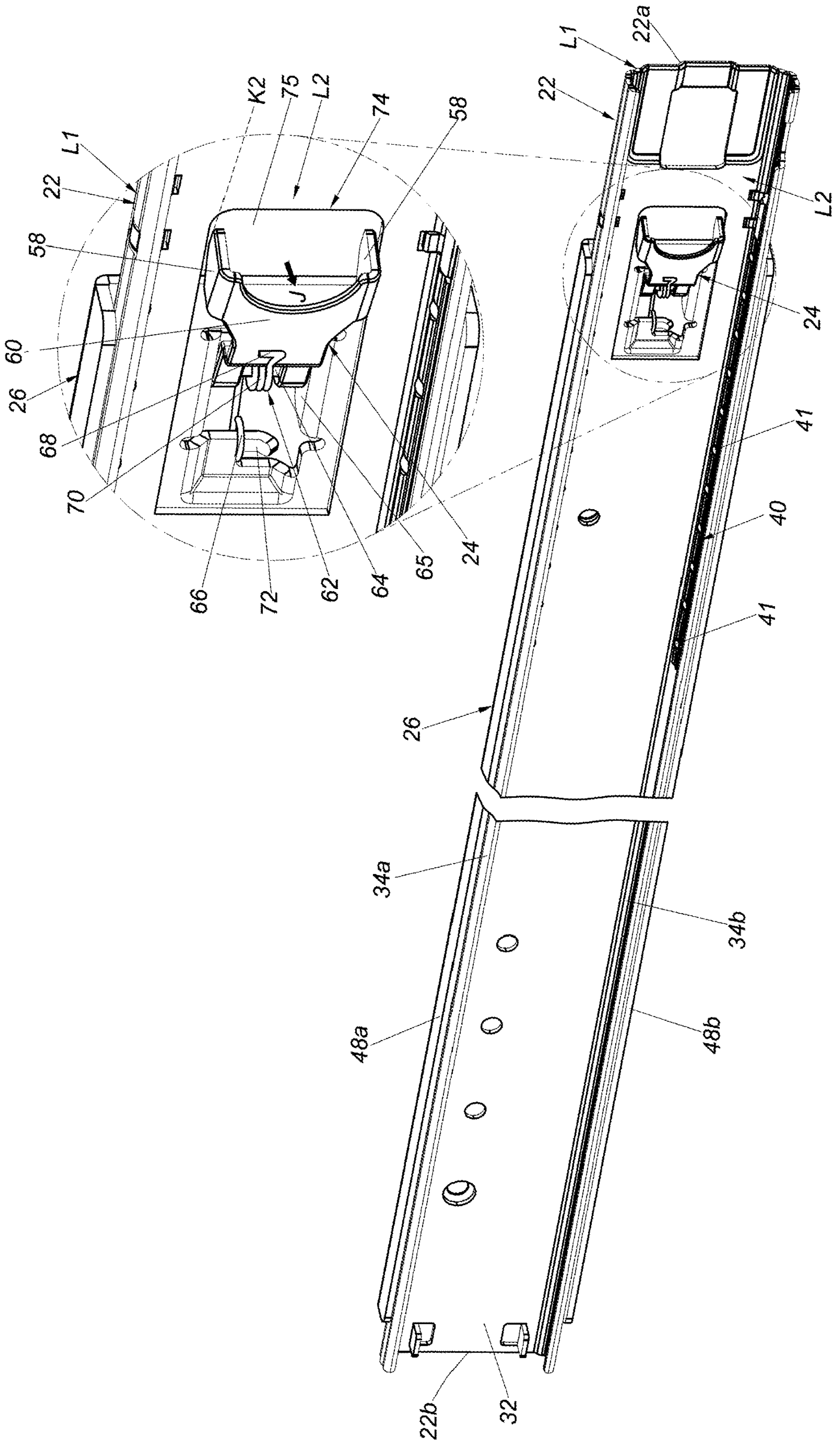
FIG. 5 is a diagram showing the first rail from the second viewing angle with the locking member being in an unlocking state according to the first embodiment of the present invention.

As shown in FIG. 4 and FIG. 5, if the user is going to operate the locking member 24 to move away from the locking state K1, the user can apply an operating force J to the locking member 24. For example, the finger of the user can pass through a predetermined space 75 of the predetermined hole 74 from the inner side L2 of the first rail 22 to the outer side L1 of the first rail 22, and apply the operating force J to the operating part 60 of the locking member 24 in a direction opposite to the elastic force F to overcome the elastic force F, so as to move the locking member 24 to switch from the locking state K1 (as shown in FIG. 4) to an unlocking state K2 (as shown in FIG. 5), such that the locking part 58 of the locking member 24 is moved toward the inner side L2 of the side wall 32 of the first rail 22.

Figure 6:
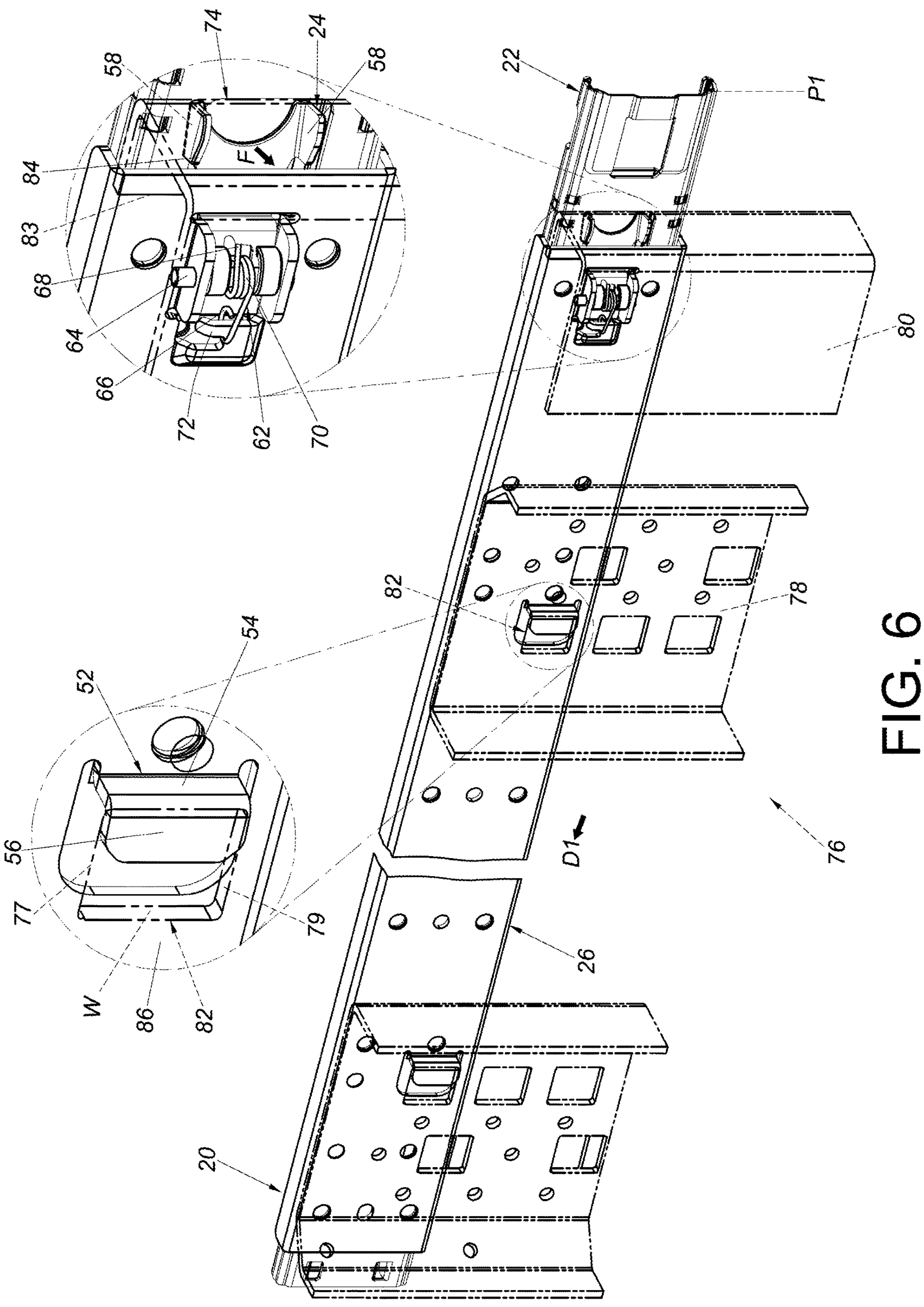
FIG. 6 is a diagram showing a process of mounting the slide rail kit to a rack according to the first embodiment of the present invention.
Figure 7:
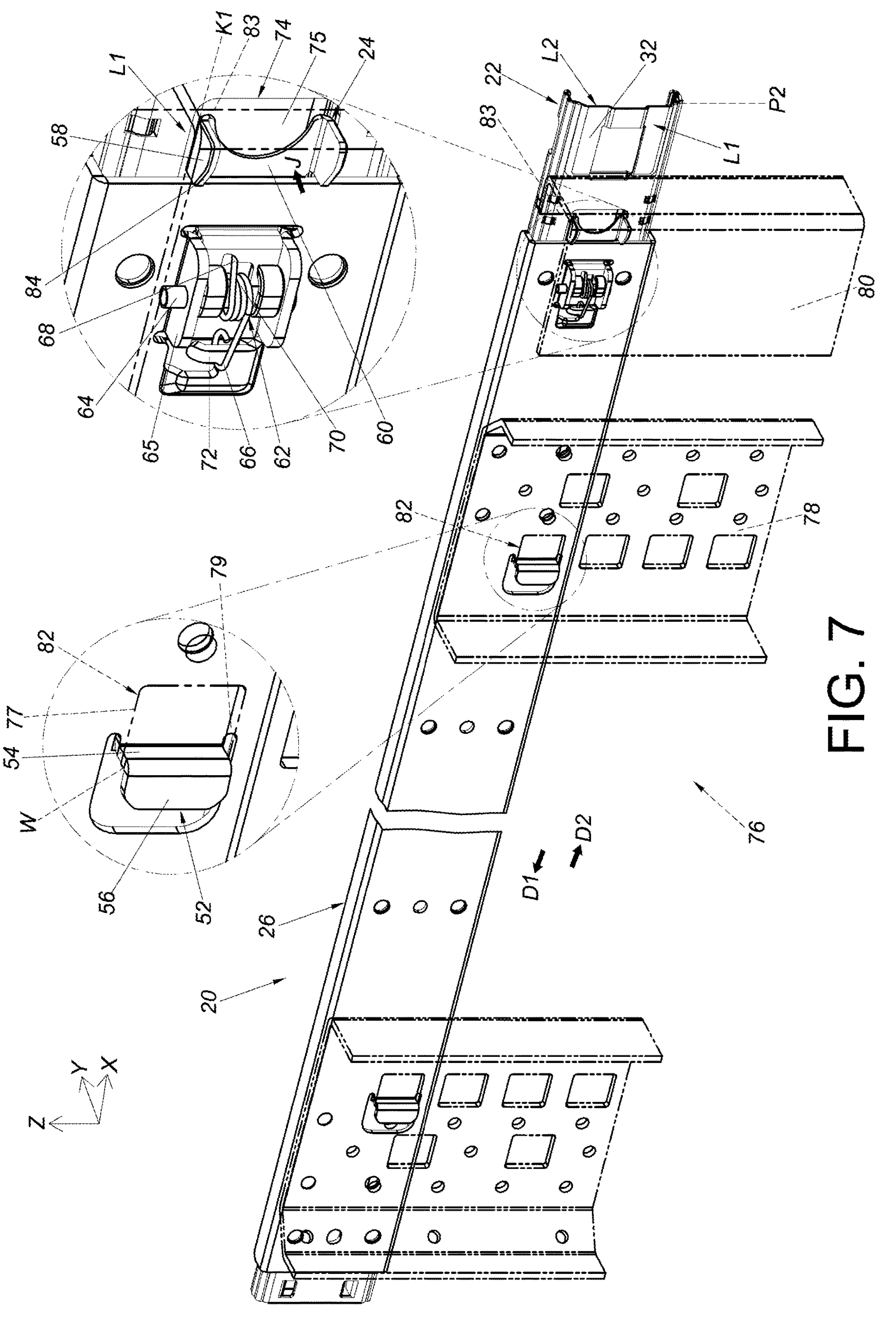
FIG. 7 is a diagram showing the slide rail kit being mounted to the rack with the locking member being blocked by the rack according to the first embodiment of the present invention.

As shown in FIG. 6 and FIG. 7, the slide rail kit 20 can be mounted to a rack 76. The rack 76 comprises at least one post, such as a first post 78 and a second post 80. However, the number of the posts is not limited. The first post 78 of the rack 76 comprises a plurality of mounting structures 82 which are spaced apart from each other along a height direction of the rack 76. In the present embodiment, the plurality of mounting structures 82 are mounting holes, but the present invention is not limited thereto. The rack 76 further comprises a blocking wall 83. In the present embodiment, the second post 80 comprises the blocking wall 83, but the present invention is not limited thereto. In addition, the locking part 58 of the locking member 24 comprises a guiding section 84, and the guiding section 84 has an inclined surface or an arc surface.

Furthermore, the slide rail kit 20 is configured to be mounted to the rack 76 (as shown in FIG. 7). During such mounting process, the mounting feature 52 on the bracket 26 of the first rail 22 can be transversely (laterally) inserted into the mounting structure 82 (the mounting hole). In the meantime, the first rail 22 is located at a predetermined position P1 relative to the rack 76 (as shown in FIG. 6), and the guiding section 84 of the locking part 58 corresponds to or contacts a lateral side of the blocking wall 83 of the rack 76, such that the elastic structure 62 is in a state of accumulating the elastic force F (as shown in FIG. 6).

When the first rail 22 is moved relative to the rack 76 from the predetermined position P1 along a first predetermined direction D1 (as shown in FIG. 6) to a mounting position P2 (as shown in FIG. 7), the mounting feature 52 of the first rail 22 is configured to mount the first rail 22 to the mounting structure 82 of the rack 76. Specifically, the mounting feature 52 of the first rail 22 is configured to be mounted to the mounting structure 82 and blocked by a hole wall W of the mounting structure 82 in order to prevent the first rail 22 from being moved relative to the rack 76 along the first predetermined direction D1. In addition, when the first rail 22 is located at the mounting position P2 relative to the rack 76 (as shown in FIG. 7), the guiding section 84 of the locking part 58 no longer corresponds to (or no longer contacts) the lateral side of the blocking wall 83 of the rack 76, such that the locking member 24 is in the locking state K1 (as shown in FIG. 7) in response to the elastic force F released by the elastic structure 62. Furthermore, the locking part 58 is configured to be held at the outer side L1 of the side wall 32 of the first rail 22 in response to the elastic force F of the elastic structure 62 to be in a state being blocked by the rack 76, such that the locking part 58 of the locking member 24 is configured to be blocked by the blocking wall 83 of the second post 80 of the rack 76. In other words, the locking part 58 of the locking member 24 is blocked by the blocking wall 83 of the rack 76, in order to prevent the first rail 22 from being moved along a second predetermined direction D2 relative to the rack 76, such that the mounting feature 52 of the first rail 22 cannot be detached from the mounting structure 82 (as shown in FIG. 7). In addition, the second predetermined direction D2 is opposite to the first predetermined direction D1.

Preferably, when the first rail 22 is located at the mounting position P2 relative to the rack 76 (as shown in FIG. 7), the first predetermined section 54 of the mounting feature 52 is blocked by the hole wall W of the mounting structure 82 in the first predetermined direction D1, and the first predetermined section 54 of the mounting feature 52 is blocked by an upper hole wall 77 and a lower hole wall 79 of the mounting structure 82 in the height direction to prevent the first rail 22 from being moved relative to the rack 76 along the height direction. In addition, the second predetermined section 56 of the mounting feature 52 is configured to hold a predetermined lateral surface 86 (please refer to FIG. 6) adjacent to the hole wall W.

Figure 8:
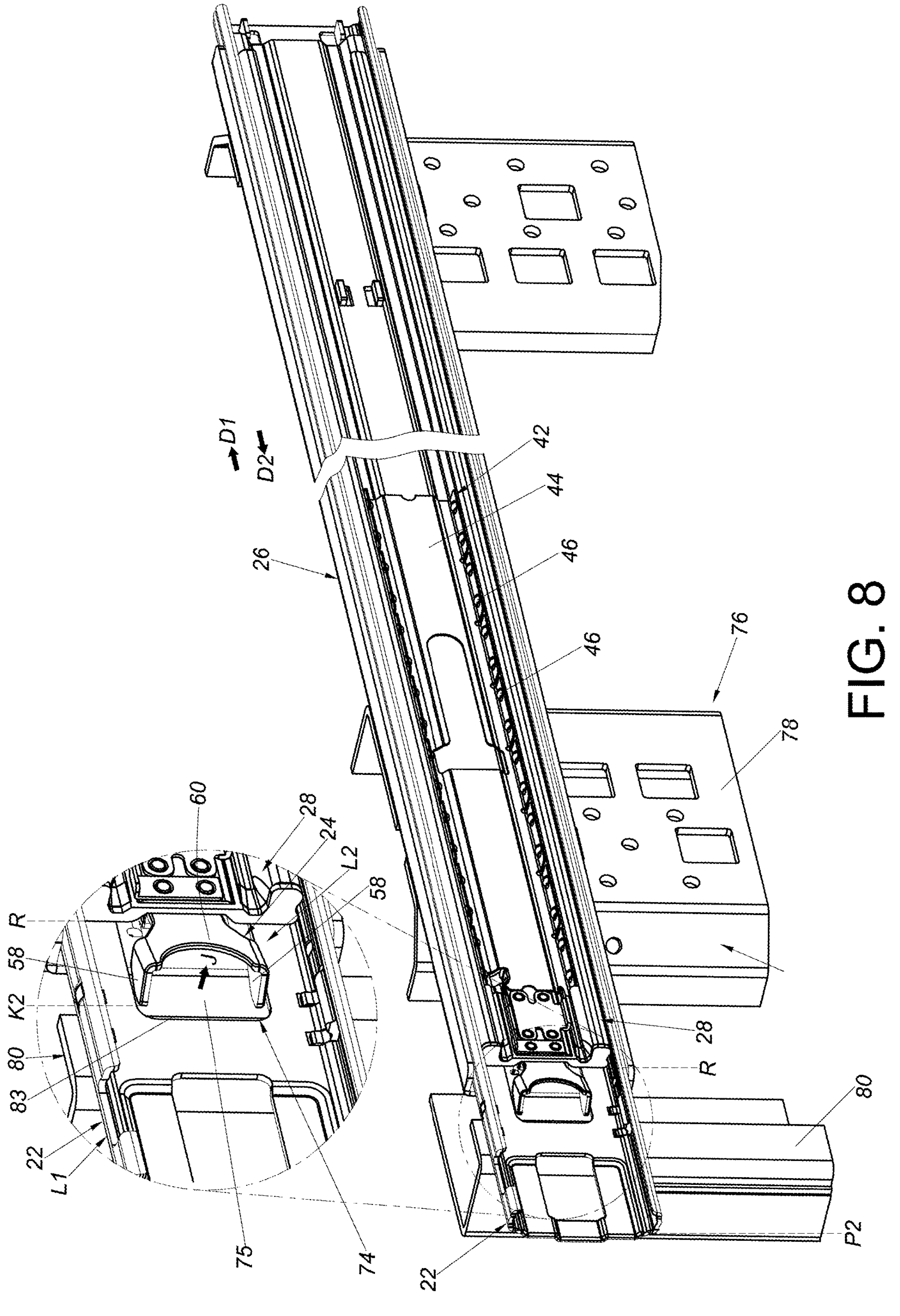
FIG. 8 is a diagram showing the slide rail kit being on the rack with the locking member being no longer blocked by the rack according to the first embodiment of the present invention.

As shown in FIG. 7 and FIG. 8, when the user is going to detach the first rail 22 from the rack 76, the user can apply the operating force J to the operating part 60 of the locking member 24, so as to move the locking member 24 to switch from the locking state K1 (as shown in FIG. 7) to the unlocking state K2 (as shown in FIG. 8). In other words, the operating part 60 can be operated to move the locking part 58 toward the inner side L2 of the side wall 32, so as to prevent the locking part 58 of the locking member 24 from being blocked by the blocking wall 83 of the rack 76 (as shown in FIG. 8), such that the locking part 58 of the locking member 24 is no longer in the state being blocked by the blocking wall 83 of the rack 76. Therefore, the first rail 22 is movable relative to the rack 76 from the mounting position P2 along the second predetermined direction D2, and the mounting feature 52 can be detached and separated from the mounting structure 82 of the rack 76, so as to detach the first rail 22 from the rack 76.

Preferably, when the user is going to detach the first rail 22 from the rack 76, the user can first detach the third rail 30 from the passage 38 of the second rail 28 (the third rail 30 is not shown in FIG. 8). When the third rail 30 is detached from the passage 38 of the second rail 28 and when the second rail 28 is located at a retracted position R relative to the first rail 22 (as shown in FIG. 8), the second rail 28 does not cover the operating part 60 of the locking member 24, such that the user can easily operate the locking member 24 from the inner side L2 of the side wall 32 of the first rail 22. For example, the finger of the user can pass through the predetermined space 75 of the predetermined hole 74 from the inner side L2 of the first rail 22 to the outer side L1 of the first rail 22, and apply the operating force J to the operating part 60 of the locking member 24, in order to move the locking member 24 to switch from the locking state K1 (as shown in FIG. 7) to the unlocking state K2 (as shown in FIG. 8), such that the locking part 58 of the locking member 24 is moved away from the state being blocked by the blocking wall 83 of the rack 76.

Figure 9:
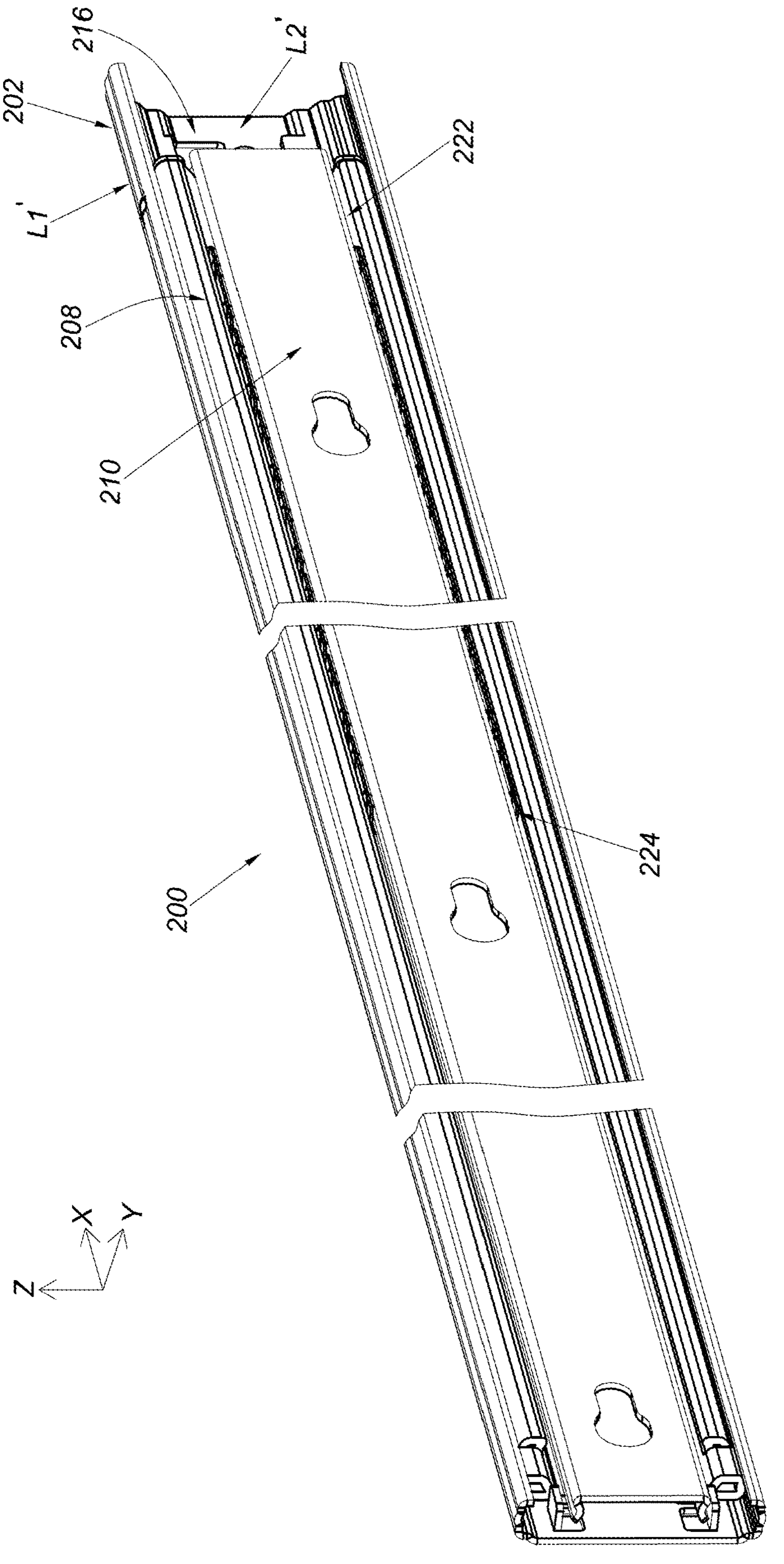
FIG. 9 is a diagram showing a slide rail kit according to a second embodiment of the present invention.
Figure 10:
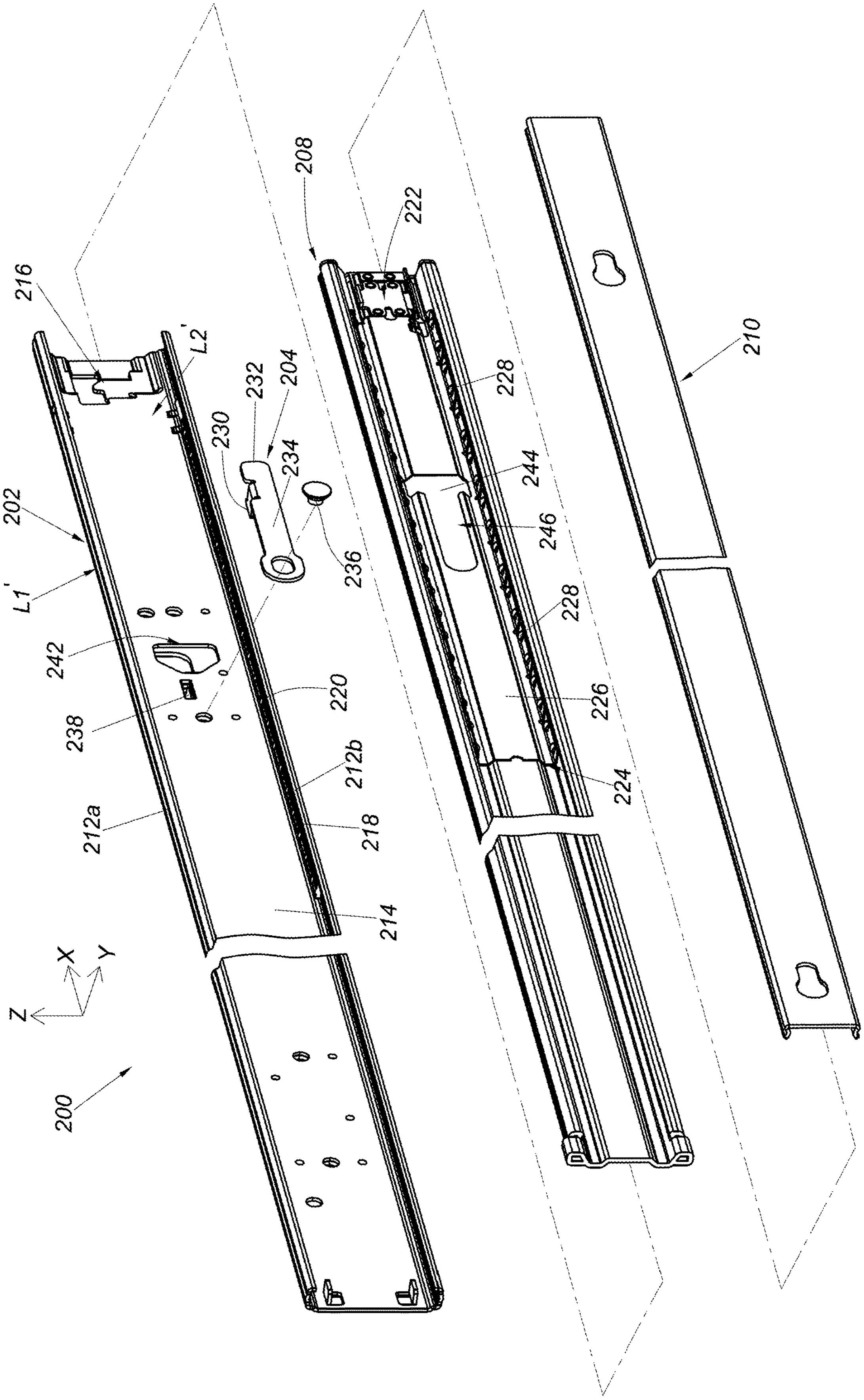
FIG. 10 is an exploded view of the slide rail kit comprising a first rail, a second rail and a third rail according to the second embodiment of the present invention.

FIG. 9 and FIG. 10 show a slide rail kit 200 according to a second embodiment of the present invention. In contrast to the slide rail kit 20 of the first embodiment, a locking member 204 of the slide rail kit 200 of the second embodiment has different configuration.

Furthermore, a first rail 202 comprises a first wall **212*a*, a second wall 212*b* and a side wall 214 connected between the first wall 212*a* and the second wall 212*b*. A passage 216 is defined by the first wall 212*a*, the second wall 212*b* and the side wall 214 of the first rail 202. A second rail 208 is movably mounted in the passage 216 of the first rail 202, and the second rail 208 is located at an inner side L2' of a side wall 214 of the first rail 202**.

Preferably, the slide rail kit 200 further comprises at least one first slide assisting device 218 movably mounted between the first rail 202 and the second rail 208, and configured to assist relative movement between the first rail 202 and the second rail 208. Preferably, the slide rail kit 200 of the second embodiment comprises two first slide assisting devices 218 respectively located inside the passage 216 of the first rail 202 and adjacent to the first wall 212*a* and the second wall 212*b* respectively, but the present invention is not limited thereto. Each of the first slide assisting devices 218 comprises a plurality of balls 220. Due to the viewing angle, only the first slide assisting device 218 adjacent to the second wall 212*b* is shown in FIG. 10.

A third rail 210 is movably mounted in a passage 222 of the second rail 208, and a second slide assisting device 224 is movably mounted between the second rail 208 and the third rail 210 and configured to assist relative movement between the second rail 208 and the third rail 210. The second slide assisting device 224 comprises a ball retainer 226 and a plurality of balls 228 mounted on the ball retainer 226.

Figure 11:
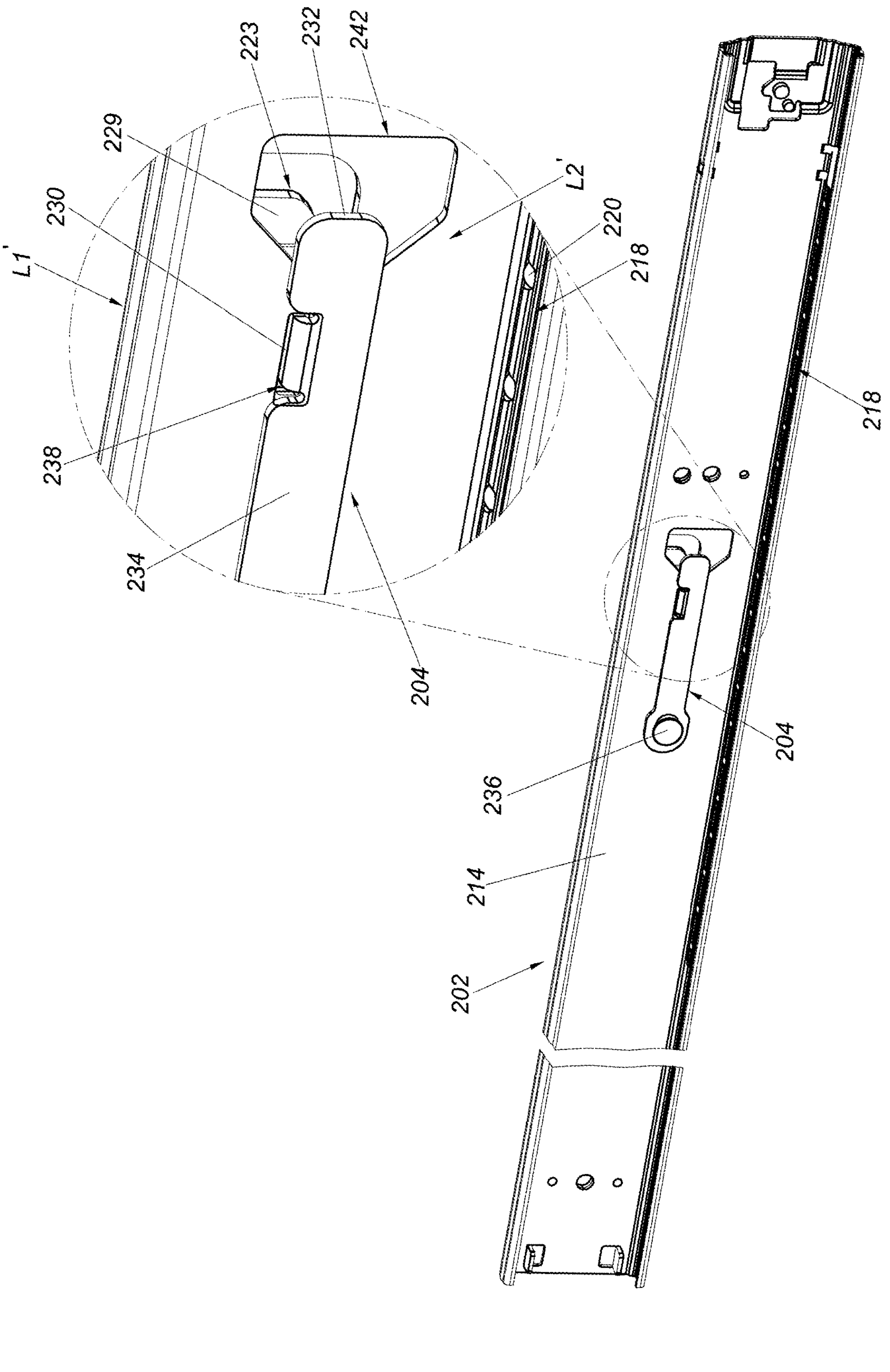
FIG. 11 is a diagram showing the first rail from a first viewing angle according to the second embodiment of the present invention.
Figure 12:
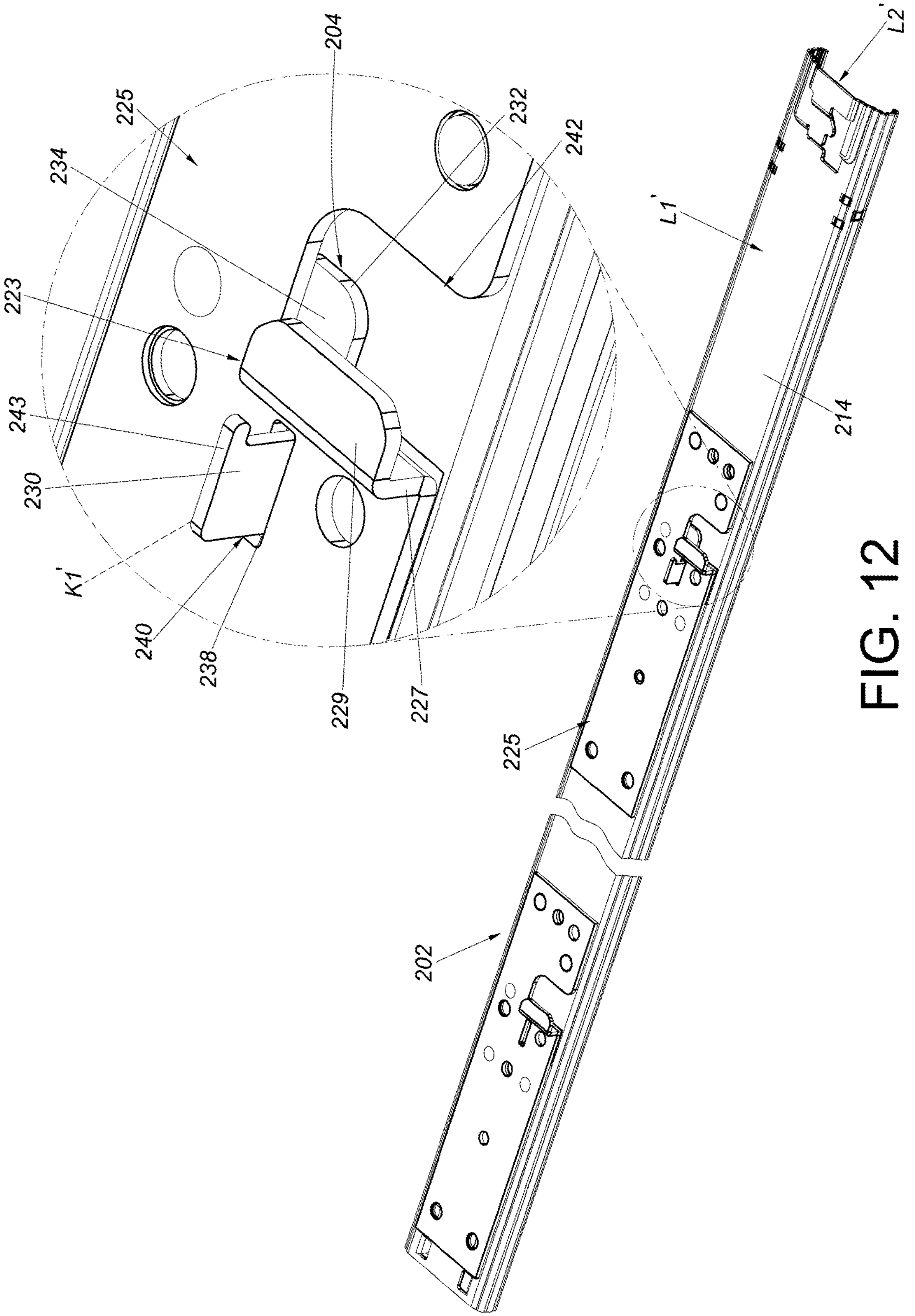
FIG. 12 is a diagram showing the first rail from a second viewing angle with a locking member being in a locking state according to the second embodiment of the present invention.

As shown in FIG. 10, FIG. 11 and FIG. 12, the first rail 202 is arranged with at least one mounting feature 223 (as shown in FIG. 11 and FIG. 12). In the present embodiment, the mounting feature 223 is arranged on an outer side L1' of the side wall 214 of the first rail 202, and the mounting feature 223 is an insertion structure, but the present is not limited thereto. Preferably, the first rail 202 is arranged with an auxiliary member 225 attached (such as fixed) to the outer side L1' of the side wall 214 of the first rail 202, such that the auxiliary member 225 and the first rail 202 can be seen as one piece (as shown in FIG. 12); or in an alternative embodiment, the auxiliary member 225 can be integrated into the first rail 202. However, the present invention is not limited thereto. The mounting feature 223 is arranged on the auxiliary member 225.

Preferably, the mounting feature 223 has a first predetermined section 227 and a second predetermined section 229. The first predetermined section 227 is transversely (laterally) extended from a side part of the auxiliary member 225. The second predetermined section 229 is bent relative to the first predetermined section 227. For example, the second predetermined section 229 is substantially perpendicularly connected to the first predetermined section 227, and the second predetermined section 229 is substantially parallel to a length direction of the first rail 202 (and the auxiliary member 225) (as shown in FIG. 12), but the present invention is not limited thereto.

The locking member 204 comprises a locking part 230, an operating part 232 and an elastic structure 234. The elastic structure 234 is connected (such as fixed) to the inner side L2' of the side wall 214 of the first rail 202 through a connecting member 236 (as shown in FIG. 10 and FIG. 11). The elastic structure 234 has a predetermined longitudinal length. Preferably, the locking part 230 is arranged on the elastic structure 234, and the operating part 232 is operably connected to the locking part 230. In the present embodiment, the locking part 230, the elastic structure 234 and the operating part 232 are integrated into the locking member 204 as a single component. The locking part 230 is configured to be held at the outer side L1' of the side wall 214 of the first rail 202 (as shown in FIG. 12) in response to an elastic force of the elastic structure 234. Furthermore, the locking member 204 is configured to be held in a locking state K1' in response to the elastic force of the elastic structure 234, such that the locking part 230 of the locking member 204 is held at the outer side L1' of the side wall 214 of the first rail 202.

Preferably, the first rail 202 is formed with an auxiliary hole 238 communicating the outer side L1' and the inner side L2' of the side wall 214 of the first rail 202, and the locking part 230 of the locking member 204 is partially extended from the inner side L2' of the side wall 214 of the first rail 202 to the outer side L1' of the side wall 214 of the first rail 202 through the auxiliary hole 238. The auxiliary member 225 has a corresponding hole 240 corresponding to the auxiliary hole 238. The corresponding hole 240 is configured to allow the locking part 230 of the locking member 204 to pass through to be located at the outer side L1' of the side wall 214 of the first rail 202 (as shown in FIG. 12).

Preferably, the first rail 202 is formed with a predetermined hole 242 communicating the outer side L1' and the inner side L2' of the side wall 214 of the first rail 202. The predetermined hole 242 is arranged at a position at least corresponding to the operating part 232 of the locking member 204 so as to allow the user to easily operate the operating part 232 of the locking member 204 by the finger.

Preferably, the locking part 230 of the locking member 204 comprises a guiding section 243. For example, the guiding section 243 has an inclined surface or an arc surface (as shown in FIG. 12).

Preferably, the second rail 208 has an opening 244, and the ball retainer 226 has a through hole 246 corresponding to the opening 244 of the second rail 208 (as shown in FIG. 10).

Figure 13:
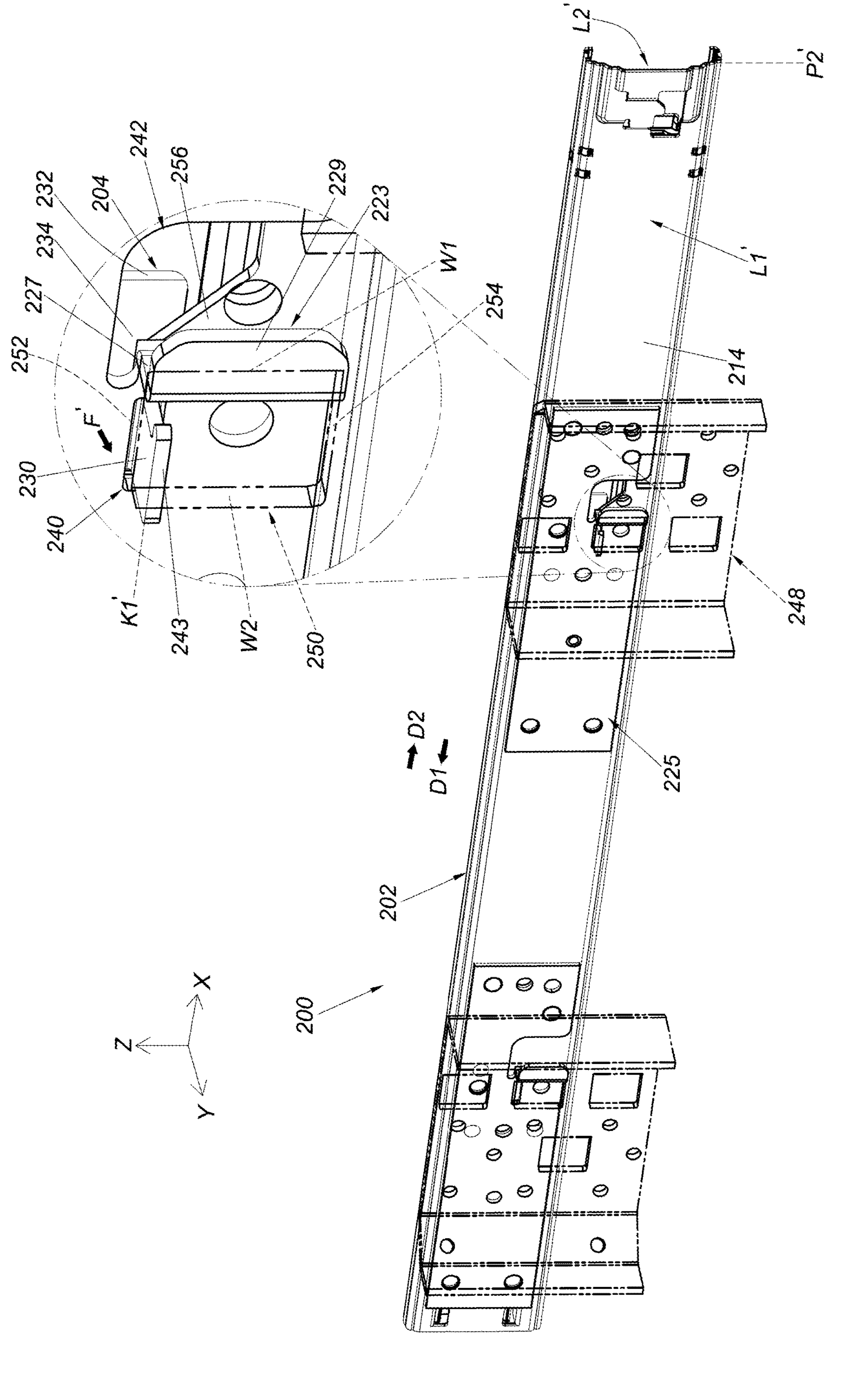
FIG. 13 is a diagram showing the slide rail kit being mounted to the rack with the locking member being blocked by the rack according to the second embodiment of the present invention.

As shown in FIG. 13, the slide rail kit 200 is applicable to a rack 248. The rack 248 comprises a plurality of mounting structures 250. In the present embodiment, the plurality of mounting structures 250 are mounting holes, but the present invention is not limited thereto. Each of the mounting structures 250 is defined by a plurality of hole walls, such as a first hole wall W1 and a second hole wall W2. The first hole wall W1 and the second hole wall W2 are a front hole wall and a rear hole wall respectively.

Furthermore, the slide rail kit 200 is configured to be mounted to the rack 248. During such mounting process, the mounting feature 223 the first rail 202 can be transversely (laterally) inserted into the mounting structure 250 (the mounting hole). When the first rail 202 is moved relative to the rack 248 from a predetermined position along a second predetermined direction D2 to a mounting position P2', the mounting feature 223 of the first rail 202 is configured to mount the first rail 202 to the mounting structure 250 of the rack 248. Specifically, the mounting feature 223 of the first rail 202 is configured to be mounted to the mounting structure 250 and blocked by the first hole wall W1 of the mounting structure 250 in order to prevent the first rail 202 from being moved relative to the rack 248 along the second predetermined direction D2. In addition, when the first rail 202 is located at the mounting position P2' relative to the rack 248, the guiding section 243 of the locking part 230 has crossed a lateral surface adjacent to the second hole wall W2 of the rack 248, such that the locking member 204 is in the locking state K1' in response to an elastic force F' released by the elastic structure 234. Furthermore, the locking part 230 is configured to be held at the outer side L1' of the side wall 214 of the first rail 202 in response to the elastic force F' of the elastic structure 234 to be in a state being blocked by the rack 248, such that the locking part 230 of the locking member 204 is configured to be blocked by the second hole wall W2 of the mounting structure 250 of the rack 248. In other words, the locking part 230 of the locking member 204 is blocked by the second hole wall W2 of the rack 248, in order to prevent the first rail 202 from being moved along a first predetermined direction D1 relative to the rack 248, such that the mounting feature 223 of the first rail 202 cannot be detached from the mounting structure 250. In addition, the first predetermined direction D1 is opposite to the second predetermined direction D2.

Preferably, when the first rail 202 is located at the mounting position P2' relative to the rack 248, the first predetermined section 227 of the mounting feature 223 is blocked by the first hole wall W1 of the mounting structure 250 in the second predetermined direction D2, and the first predetermined section 227 of the mounting feature 223 is blocked by an upper hole wall 252 and a lower hole wall 254 of the mounting structure 250 in the height direction to prevent the first rail 202 from being moved relative to the rack 248 along the height direction. In addition, the second predetermined section 229 of the mounting feature 223 is configured to hold a predetermined lateral surface 256 adjacent to the first hole wall W1.

Figure 14:
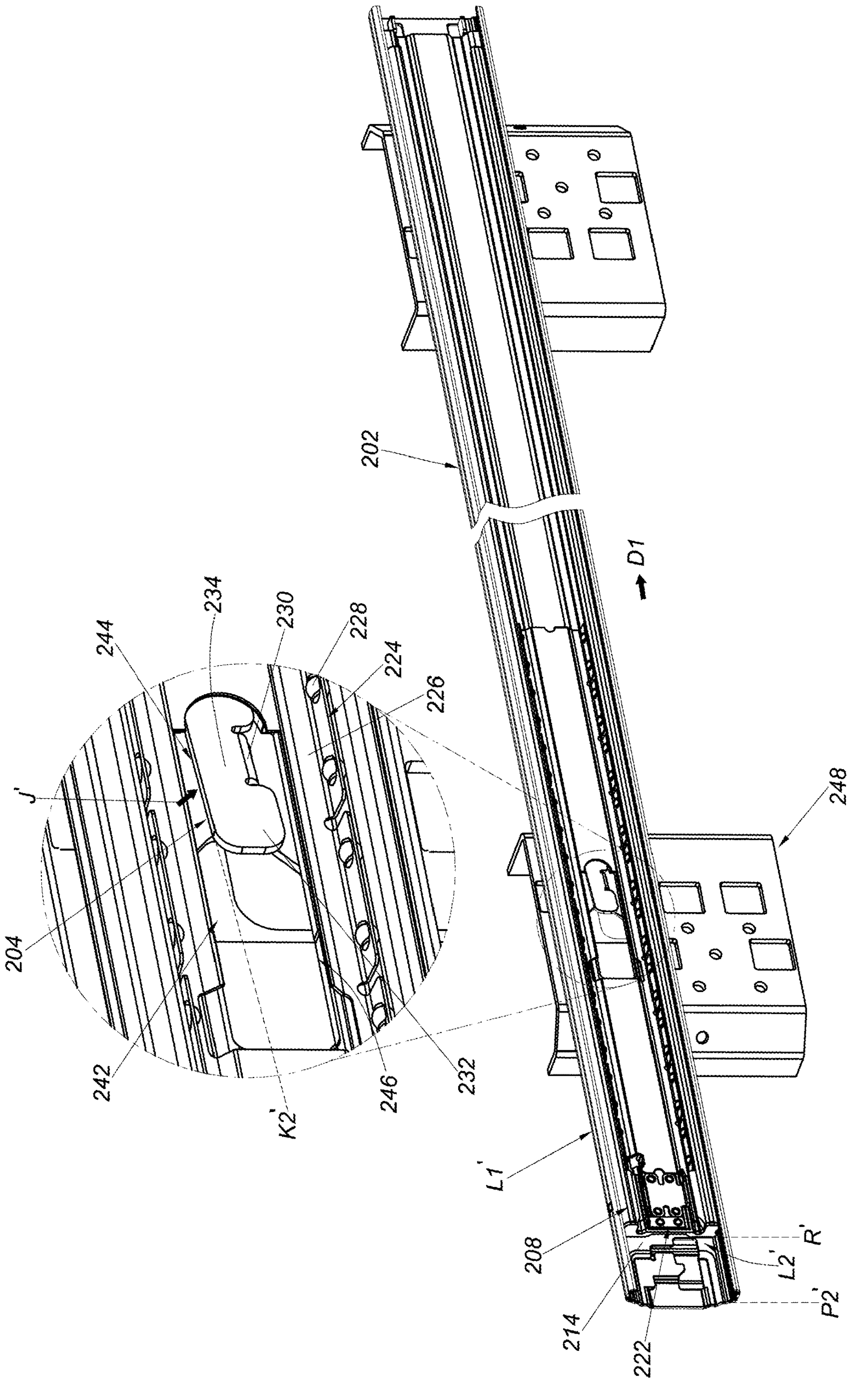
FIG. 14 is a diagram showing the slide rail kit being mounted on the rack from a first viewing angle with the locking member being no longer blocked by the rack according to the second embodiment of the present invention.
Figure 15:
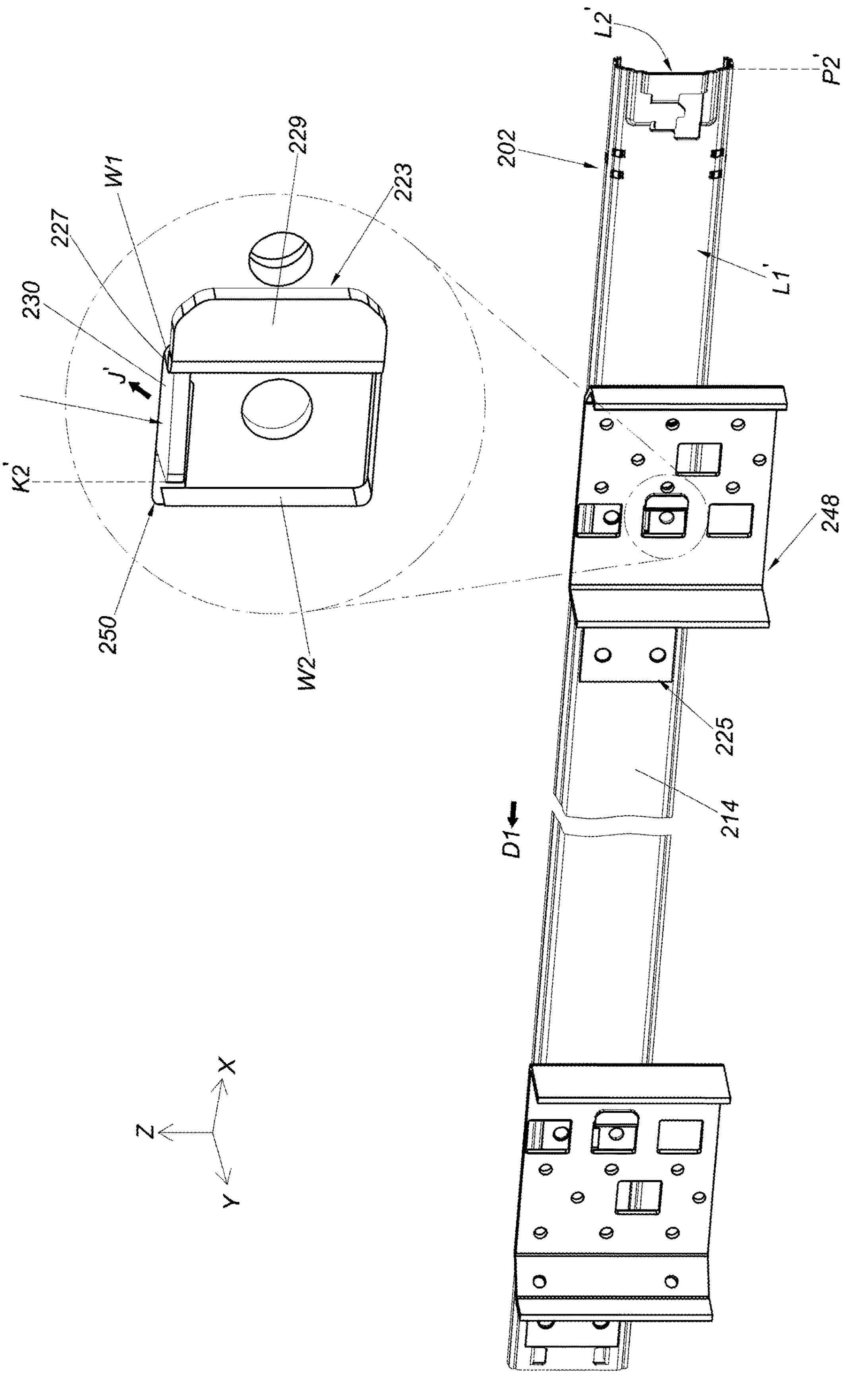
FIG. 15 is a diagram showing the slide rail kit being mounted on the rack from a second viewing angle with the locking member being no longer blocked by the rack according to the second embodiment of the present invention.

As shown in FIG. 14 and FIG. 15, when the user is going to detach the first rail 202 from the rack 248, the user can apply an operating force J' to the operating part 232 of the locking member 204 (as shown in FIG. 14), so as to move the locking member 204 to switch from the locking state K1' to an unlocking state K2'. In other words, the operating part 232 can be operated to move the locking part 230 toward the inner side L2' of the side wall 214, so as to prevent the locking part 230 of the locking member 204 from being blocked by the second hole wall W2 of the rack 248 (as shown in FIG. 15), such that the locking part 230 of the locking member 204 is no longer in the state being blocked by the second hole wall W2 of the rack 248. Therefore, the first rail 202 is movable relative to the rack 248 from the mounting position P2' along the first predetermined direction D1, and the mounting feature 223 can be detached and separated from the mounting structure 250 of the rack 248, so as to detach the first rail 202 from the rack 248.

Preferably, when the user is going to detach the first rail 202 from the rack 248, the user can first detach the third rail 210 from the passage 222 of the second rail 208 (the third rail 210 is not shown in FIG. 14). When the third rail 210 is detached from the passage 222 of the second rail 208 and when the second rail 208 is located at a retracted position R' relative to the first rail 202 (as shown in FIG. 14), the opening 244 of the second rail 208 corresponds to the operating part 232 of the locking member 204. In other words, the second rail 208 does not cover the operating part 232 of the locking member 204, such that the user can easily operate the locking member 204 from the inner side L2' of the side wall 214 of the first rail 202 (as shown in FIG. 14). Preferably, the through hole 246 of the ball retainer 226 of the second slide assisting device 224 corresponds to the opening 244 of the second rail 208. Accordingly, the operating part 232 of the locking member 204 can be exposed to allow the user to easily operate the locking member 204 from the inner side L2' of the side wall 214 of the first rail 202 (as shown in FIG. 14). For example, the user can easily apply the operating force J' by the finger to the operating part 232 of the locking member 204 through the predetermined hole 242 from the inner side L2' of the first rail 202, so as to move the locking member 204 to switch from the locking state K1' to the unlocking state K2' (as shown in FIG. 14 and FIG. 15), such that the locking part 230 of the locking member 204 is moved away from the state being blocked by the second hole wall W2 of the rack 248 (as shown in FIG. 15). As such, the first rail 202 is movable relative to the rack 248 from the mounting position P2' along the first predetermined direction D1, and the mounting feature 223 can be detached and separated from the mounting structure 250 of the rack 248, so as to detach the first rail 202 from the rack 248.

Therefore, the slide rail kit (20, 200) according to the embodiment of the present invention has the following technical features:

1. The slide rail kit (20, 200) can be rapidly mounted to the rack (76, 248) or detached from the rack (76, 248) by the user without a tool.
2. In the first embodiment, the locking member 24 is movable relative to the first rail 22 (or the bracket 26). For example, the locking member 24 is pivotally connected to the bracket 26 on the first rail 22. When the first rail 22 is mounted to the mounting structure 82 of the rack 76 through the mounting feature 52 on the first rail 22 (or the bracket 26), the locking part 58 of the locking member 24 is configured to be held at the outer side L1 of the side wall 32 of the first rail 22 in response to the elastic force F of the elastic structure 62 to be in the state being blocked by the rack 76, such that the mounting feature 52 of the first rail 22 cannot be detached from the mounting structure 82 of the rack 76.
3. In the first embodiment, when the second rail 28 is located at the retracted position R relative to the first rail 22, the second rail 28 does not cover the operating part 60 of the locking member 24, such that the user can easily operate the locking member 24 from the inner side L2 of the side wall 32 of the first rail 22. For example, the user can apply the operating force J to the operating part 60 of the locking member 24, to move the locking member 24 to switch from the locking state K1 to the unlocking state K2. Therefore, the locking member 24 is no longer in the state being blocked by the rack 76, such that the mounting feature 52 of the first rail 22 can be detached from the mounting structure 82 of the rack 76. According to such arrangement, the slide rail kit can meet different market requirements.
4. In the second embodiment, the locking part 230, the elastic structure 234 and the operating part 232 are integrated into the locking member 204 as a single component. The locking member 204 is connected (such as fixed) to the first rail 202 through the elastic structure 234. The mounting feature 223 on the first rail 202 is configured to be mounted to the mounting structure 250 of the rack 248, and the locking part 230 of the locking member is configured to be held at the outer side L1' of the side wall 214 of the first rail 202 in response to the elastic force F' of the elastic structure 234 to be in the state being blocked by the rack 248, such that the mounting feature 223 of the first rail 202 cannot be detached from the mounting structure 250 of the rack 248.
5. In the second embodiment, when the second rail 208 is located at the retracted position R' relative to the first rail 202, the opening 244 of the second rail 208 corresponds to the operating part 232 of the locking member 204. In other words, the second rail 208 does not cover the operating part 232 of the locking member 204, such that the user can easily operate the locking member 204 from the inner side L2' of the side wall 214 of the first rail 202 to move the locking member 204 to switch from the locking state K1' to the unlocking state K2', such that the mounting feature 223 of the first rail 202 can be detached from the mounting structure 250 of the rack 248. According to such arrangement, the slide rail kit can meet different market requirements Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail kit applicable to a rack, the slide rail kit comprising:

a first rail comprising a first wall, a second wall and a side wall connected between the first wall and the second wall, wherein a bracket is attached to the first rail, a mounting feature is arranged on the bracket, and the side wall has an inner side and an outer side facing toward the rack, wherein the bracket comprises a first edge part, a second edge part and a side part connected between the first edge part and the second edge part, the side part of the bracket is fixed to the outer side of the side wall of the first rail, and the first edge part and the second edge part of the bracket are configured to respectively hold the first wall and the second wall of the first rail; and a locking member movably mounted to the side part of the bracket on the first rail and comprising a locking part and an operating part, wherein the side wall of the first rail is formed with a predetermined hole communicating the outer side and the inner side of the side wall, and the predetermined hole at least corresponds to the operating part of the locking member;

wherein the mounting feature is configured to mount the first rail to a mounting structure of the rack;

wherein the locking part is configured to be held at the outer side of the side wall of the first rail to be blocked by the rack in response to an elastic force of an elastic structure;

wherein the operating part is configured to be operated to move the locking part toward the inner side of the side wall of the first rail, such that the locking part is no longer blocked by the rack.

2. The slide rail kit of claim 1, wherein the mounting structure of the rack is a mounting hole, and the mounting feature is configured to be mounted to the mounting hole and blocked by a hole wall of the mounting hole to prevent the first rail from being moved relative to the rack along a first predetermined direction.

3. The slide rail kit of claim 2, wherein when the locking part is blocked by the rack, the locking part is configured to prevent the first rail from being moved relative to the rack along a second predetermined direction different from the first predetermined direction.

4. The slide rail kit of claim 1, wherein the locking member is pivotally connected to the side part of the bracket on the first rail through a shaft member to be rotatable relative to the bracket.

5. The slide rail kit of claim 4, wherein the elastic structure comprises a first elastic section and a second elastic section, the first elastic section is configured to contact one of the bracket and the first rail, and the second elastic section is configured to contact the locking member.

6. The slide rail kit of claim 1, wherein the first rail has a first end part and a second end part opposite to each other, and the locking member is located adjacent to the first end part of the first rail.

7. The slide rail kit of claim 1, wherein a passage is defined by the first wall, the second wall and the side wall; wherein the slide rail kit further comprises a second rail movably mounted in the passage of the first rail, and the second rail is located at the inner side of the side wall of the first rail; wherein when the second rail is located at a retracted position relative to the first rail, the second rail does not cover the operating part.

8. The slide rail kit of claim 7, further comprising at least one first slide assisting device mounted between the first rail and the second rail and configured to assist relative movement between the first rail and the second rail.

9. The slide rail kit of claim 8, further comprising a third rail movably mounted to the second rail, and a second slide assisting device mounted between the second rail and the third rail and configured to assist relative movement between the second rail and the third rail.

10. The slide rail kit of claim 1, wherein a passage is defined by the first wall, the second wall and the side wall; wherein the slide rail kit further comprises a second rail movably mounted in the passage of the first rail, and the second rail is located at an inner side of the side wall of the first rail.

11. A slide rail kit applicable to a rack, the slide rail kit comprising:

a first rail comprising a first wall, a second wall and a side wall connected between the first wall and the second wall, a passage being defined by the first wall, the second wall and the side wall, the side wall having an inner side and an outer side facing toward the rack, wherein a bracket is attached to the first rail, a mounting feature is arranged on the bracket, the bracket comprises a first edge part, a second edge part and a side part connected between the first edge part and the second edge part, the side part of the bracket is fixed to the outer side of the side wall of the first rail, and the first edge part and the second edge part of the bracket are configured to respectively hold the first wall and the second wall of the first rail;

a second rail movably mounted in the passage of the first rail; and a locking member movably mounted to the side part of the bracket on the first rail and comprising a locking part and an operating part, wherein the side wall of the first rail is formed with a predetermined hole communicating the outer side and the inner side of the side wall, and the predetermined hole at least corresponds to the operating part of the locking member;

wherein the mounting feature is configured to mount the first rail to a mounting structure of the rack;

wherein the locking member is configured to be held in a state being blocked by the rack in response to an elastic force of an elastic structure;

wherein the operating part is configured to be operated to move the locking part away from the state being blocked by the rack;

wherein the second rail is located at the inner side of the side wall of the first rail; when the second rail is located at a retracted position relative to the first rail, the second rail does not cover the operating part.

12. The slide rail kit of claim 11, wherein the mounting structure of the rack is a mounting hole, and the mounting feature is configured to be mounted to the mounting hole and blocked by a hole wall of the mounting hole to prevent the first rail from being moved relative to the rack along a first predetermined direction; wherein when the locking part is in the state being blocked by the rack, the locking part is configured to prevent the first rail from being moved relative to the rack along a second predetermined direction opposite to the first predetermined direction.

* * * * *